(12) United States Patent
Steiner et al.

(10) Patent No.: US 11,111,992 B2
(45) Date of Patent: Sep. 7, 2021

(54) HYBRID MODULE

(71) Applicant: Schaeffler Technologies AG & Co. KG, Herzogenaurach (DE)

(72) Inventors: Micah Steiner, Smithville, OH (US); Matthew Payne, Glenmont, OH (US); Markus Steinberger, Macedonia, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 7 days.

(21) Appl. No.: 16/527,329

(22) Filed: Jul. 31, 2019

(65) Prior Publication Data

US 2020/0040976 A1   Feb. 6, 2020

Related U.S. Application Data

(60) Provisional application No. 62/743,355, filed on Oct. 9, 2018, provisional application No. 62/713,584, filed
(Continued)

(51) Int. Cl.
*F16H 45/02* (2006.01)
*F16D 21/00* (2006.01)
(Continued)

(52) U.S. Cl.
CPC .............. *F16H 45/02* (2013.01); *B60K 6/387* (2013.01); *B60K 6/405* (2013.01); *F16D 13/385* (2013.01);
(Continued)

(58) Field of Classification Search
CPC .......... F16H 45/02; F16H 41/24; F16D 21/00; F16D 13/72; F16D 13/385; F16D 21/06;
(Continued)

(56) References Cited

U.S. PATENT DOCUMENTS

| 2004/0130225 A1* | 7/2004 | Mencher ................ B60K 6/485 310/78 |
| 2006/0100053 A1* | 5/2006 | Asahi .................... F16H 57/029 475/221 |

(Continued)

FOREIGN PATENT DOCUMENTS

JP   2012086827 A   5/2012

OTHER PUBLICATIONS

Payne et al., U.S. Appl. No. 62/743,355, filed Oct. 9, 2018.

*Primary Examiner* — Mark A Manley
(74) *Attorney, Agent, or Firm* — Kevin L. Parks

(57) ABSTRACT

A hybrid module includes a housing, an electric motor, a hydraulic coupling, a first clutch, a second clutch, and a flow plate assembly. The housing is arranged for fixing to a planetary transmission and an engine. The electric motor is disposed in the housing. The electric motor has a stator fixed to the housing and a rotor rotatable relative to the housing. The hydraulic coupling is disposed in the housing and is at least partially radially inside of the electric motor. The first clutch is for drivingly connecting the rotor to the engine. The second clutch is arranged in parallel with the hydraulic coupling for drivingly connecting the rotor to an input shaft of the planetary transmission. The flow plate assembly is fixed to the housing. The flow plate assembly has a first flow plate with a first radial groove forming a first portion of a first radial flow channel, and a second flow plate, fixed to the first flow plate, forming a second portion of the first radial flow channel.

19 Claims, 2 Drawing Sheets

Related U.S. Application Data on Aug. 2, 2018, provisional application No. 62/719,268, filed on Aug. 17, 2018, provisional application No. 62/717,054, filed on Aug. 10, 2018.

(51) Int. Cl.

| | | |
|---|---|---|
| *F16H 41/24* | (2006.01) | |
| *F16D 13/72* | (2006.01) | |
| *F16D 13/38* | (2006.01) | |
| *B60K 6/387* | (2007.10) | |
| *B60K 6/405* | (2007.10) | |
| *H02K 9/00* | (2006.01) | |
| *B60L 15/20* | (2006.01) | |

(52) U.S. Cl.
CPC ............ *F16D 13/72* (2013.01); *F16D 21/00* (2013.01); *F16H 41/24* (2013.01); *B60L 15/2054* (2013.01); *H02K 9/00* (2013.01)

(58) Field of Classification Search
CPC ......... F16D 2021/0669; F16D 25/0635; F16D 25/12; B60K 6/387; B60K 6/48; B60K 6/405; B60K 6/42; B60L 15/2054
See application file for complete search history.

(56) References Cited

U.S. PATENT DOCUMENTS

| | | | |
|---|---|---|---|
| 2008/0072586 A1* | 3/2008 | Hammond | B60K 6/405 60/330 |
| 2011/0121692 A1* | 5/2011 | Iwase | B60K 6/48 310/67 R |
| 2011/0298314 A1* | 12/2011 | Atarashi | B60K 6/405 310/54 |
| 2012/0193187 A1 | 8/2012 | Osawa et al. | |
| 2012/0242199 A1 | 9/2012 | Iwase et al. | |
| 2012/0258838 A1 | 10/2012 | Hartz et al. | |
| 2012/0319514 A1 | 12/2012 | Iwase et al. | |
| 2013/0008759 A1* | 1/2013 | Kasuya | H02K 11/225 192/110 B |
| 2015/0027273 A1* | 1/2015 | Iwase | B60K 6/36 74/665 B |

* cited by examiner

HYBRID MODULE

CROSS-REFERENCE TO RELATED APPLICATIONS

This application claims the benefit of U.S. Provisional Patent Application Nos. 62/713,584, filed Aug. 2, 2018; 62/717,054, filed Aug. 10, 2018; 62/719,268, filed Aug. 17, 2018, and 62/743,355 filed Oct. 9, 2018, the disclosures of which are incorporated in their entirety by reference herein.

TECHNICAL FIELD

The present disclosure relates generally to a hybrid module, and more specifically to a torque converter and electric motor configuration in a hybrid module.

BACKGROUND

Hybrid modules are known. One example is shown in commonly-assigned copending U.S. patent application Ser. No. 16/029,992 titled OIL DISTRIBUTION IN A HYBRID MODULE TO USE CLUTCH COOLING TO COOL E-MOTOR ROTOR AND STATOR filed Jul. 9, 2018.

SUMMARY

Example embodiments broadly comprise a hybrid module with a housing, an electric motor, a hydraulic coupling, a first clutch, a second clutch, and a flow plate assembly. The housing is arranged for fixing to a planetary transmission and an engine. The electric motor is disposed in the housing. The electric motor has a stator fixed to the housing and a rotor rotatable relative to the housing. The hydraulic coupling is disposed in the housing and is at least partially radially inside of the electric motor. The first clutch is for drivingly connecting the rotor to the engine. The second clutch is arranged in parallel with the hydraulic coupling for drivingly connecting the rotor to an input shaft of the planetary transmission. The flow plate assembly is fixed to the housing. The flow plate assembly has a first flow plate with a first radial groove forming a first portion of a first radial flow channel, and a second flow plate, fixed to the first flow plate, forming a second portion of the first radial flow channel.

In some example embodiments, the first flow plate has a first radially inner orifice, and the first flow plate and the second flow plate are fixed together radially inside of the first radially inner orifice. In an example embodiment, the flow plate assembly has a first chamber in fluid communication with the first radial flow channel and the first radially inner orifice. In an example embodiment, the first flow plate and the second flow plate are fixed together radially outside of the first radially inner orifice. In some example embodiments, the second flow plate has a second radially inner orifice, the first flow plate and the second flow plate are fixed together radially inside of the second radially inner orifice, and the first flow plate and the second flow plate are fixed together radially outside of the second radially inner orifice. In some example embodiments, the first flow plate has a second radial groove, circumferentially offset from the first radial groove, forming a first portion of a second radial flow channel, and the second flow plate has a second portion of the second radial flow channel.

In some example embodiments, the flow plate assembly has a first chamber in fluid communication with the first radial flow channel, and a second chamber in fluid communication with the second radial flow channel and the second radially inner orifice. The first chamber is circumferentially offset with respect to the second chamber. In an example embodiment, the first flow plate has an undulating portion forming at least a portion of the first chamber and the second chamber. In some example embodiments, the first radial flow channel is for providing a pressurized fluid to engage the first clutch, and the second radial flow channel is for providing a cooling flow to the first clutch. In an example embodiment, the second radial flow channel also provides a cooling flow to the rotor and the stator.

Other example aspects broadly comprise a hybrid module with a housing, an electric motor, a hydraulic coupling, a first clutch, a second clutch, a flow plate assembly, a drive hub, and a first bearing. The housing is arranged for fixing to a planetary transmission and an engine. The electric motor is disposed in the housing and has a stator fixed to the housing and a rotor rotatable relative to the housing. The hydraulic coupling is disposed in the housing and is at least partially radially inside of the electric motor. The first clutch is for drivingly connecting the rotor to the engine. The second clutch is arranged in parallel with the hydraulic coupling for drivingly connecting the rotor to an input shaft of the planetary transmission. The flow plate assembly is fixed to the housing. The drive hub is arranged for driving connection to the engine. The first bearing is arranged radially between the drive hub and the flow plate assembly for radially positioning the drive hub in the housing.

In an example embodiment, the hybrid module has a lip seal with a garter spring for sealing the flow plate assembly to the drive hub. In an example embodiment, the first clutch has a clutch plate drivingly engaged with the drive hub. In an example embodiment, the hybrid module includes a bearing ring, a second bearing, and an end plate. The flow plate assembly has a first flow plate, the first flow plate has an undulating portion, the bearing ring is arranged on an outer diameter of the undulating portion, and the second bearing is arranged radially between the bearing ring and the end plate for radially positioning the rotor in the housing.

Other example aspects broadly comprise a hybrid module with a housing, an electric motor, a hydraulic coupling, a first clutch, a second clutch, and a rotor carrier. The housing is arranged for fixing to a planetary transmission and an engine. The electric motor is disposed in the housing. The electric motor has a stator fixed to the housing and a rotor rotatable relative to the housing. The hydraulic coupling is disposed in the housing and is at least partially radially inside of the electric motor. The hydraulic coupling has an impeller shell. The first clutch is for drivingly connecting the rotor to the engine. The second clutch is arranged in parallel with the hydraulic coupling for drivingly connecting the rotor to an input shaft of the planetary transmission. The rotor carrier is arranged radially between the hydraulic coupling and the rotor, is fixed to the impeller shell, and is rotationally fixed to the rotor.

In some example embodiments, the rotor carrier includes a first cylindrical portion with a radially protruding key, the rotor has a radial slot, and the radially protruding key is disposed in the radial slot to rotationally fix the rotor carrier to the rotor. In some example embodiments, the rotor carrier has a second cylindrical portion, radially outside of the first cylindrical portion, and a radial wall connecting the first cylindrical portion to the second cylindrical portion. In some example embodiments, the hybrid module has a flow plate assembly fixed to the housing, an end plate fixed to the second cylindrical portion, and a bearing disposed radially between the flow plate assembly and the end plate to radially position the rotor in the housing. In some example embodiments, the first clutch has a piston drivingly engaged with the end plate and axially displaceable relative to the end plate to engage the first clutch. In an example embodiment, the hybrid module has a backing plate fixed to the rotor carrier. The first clutch has a clutch plate, the piston is sealed to the flow plate assembly at a sealing diameter, the piston is arranged to clamp the clutch plate against the backing plate, and the backing plate has a radially inwardly extending portion with an inner diameter radially aligned with the sealing diameter.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
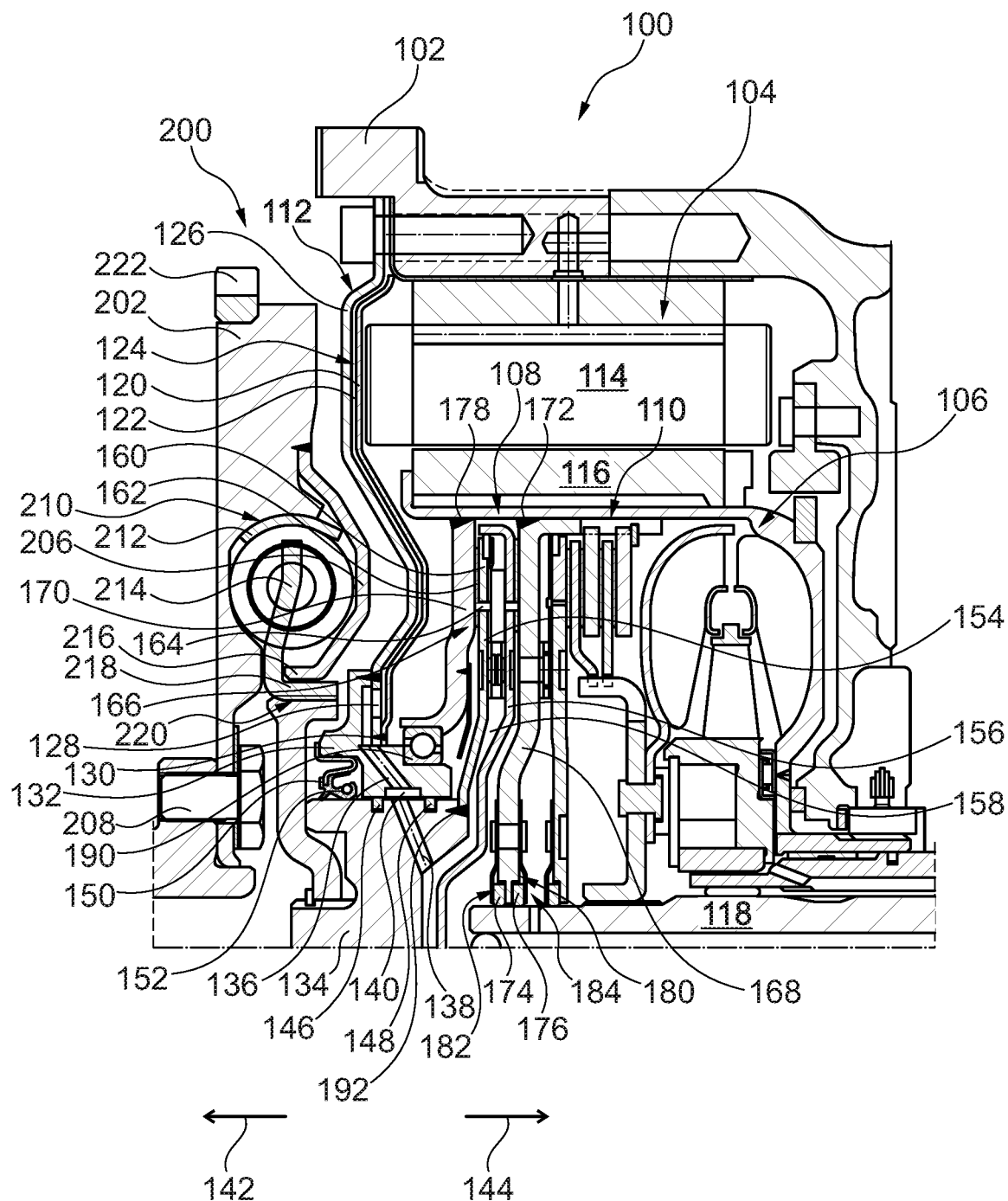
FIG. 1 illustrates a top-half cross-sectional view of a hybrid module according to an example aspect of the disclosure.

The following description is made with reference to FIG. 1. FIG. 1 illustrates a top-half cross-sectional view of hybrid module 100 according to an example aspect of the disclosure. Hybrid module 100 includes housing 102, electric motor 104, hydraulic coupling 106, clutch 108, clutch 110, and flow plate assembly 112. The housing is arranged for fixing to a planetary transmission (not shown) and an engine (not shown). The electric motor is disposed in the housing and includes stator 114, fixed to the housing, and rotor 116 rotatable relative to the housing. The hydraulic coupling is disposed in the housing and at least partially radially inside of the electric motor. Clutch 108 is for drivingly connecting the rotor to the engine. Clutch 110 is arranged in parallel with the hydraulic coupling for drivingly connecting the rotor to input shaft 118 of the planetary transmission. Flow plate assembly 112 includes flow plate 120 with radial groove 122 forming a first portion of radial flow channel 124 and flow plate 126, fixed to the flow plate 120, forming a second portion of the radial flow channel.

Flow plate 126 includes radially inner orifice 128. Flow plates 120 and 126 are fixed together radially inside of the radially inner orifice by laser weld 130, for example. Although laser welds are shown, other fixing methods such as MIG welds, TIG welds, brazing and/or adhesives may also be used to fix components together. Hybrid module 100 includes sealing hub 132, fixed to the flow plate assembly, and drive hub 134, arranged for driving connection with the engine and clutch 108. The sealing hub includes flow channel 136 hydraulically connected with the radially inner orifice. The drive hub includes flow channel 138 hydraulically connected to flow channel 136. Sealing hub 132 includes circumferential groove 140. Although the circumferential groove is shown in hub 132, in other embodiments hub 134 may include the circumferential groove, or hubs 132 and 134 may both include a circumferential groove. Flow channels 136 and 138 are hydraulically connected at the circumferential groove. Sealing hub 132 is sealed to drive hub 134 on opposite axial sides 142 and 144 of the circumferential groove by respective dynamic seals 146 and 148, for example. Hybrid module 100 includes lip seal, or shaft seal, 150 with garter spring 152 and dynamic seals 146 and 148. Each of the lip seal and the dynamic seals are for directly sealing the sealing hub to the drive hub.

Clutch 108 includes piston 154, piston 156, and apply chamber 158. Piston 156 is sealed to piston 154, rotationally fixed to piston 154, and axially displaceable relative to piston 154. Apply chamber 158 is arranged axially between pistons 154 and 156 for applying clutch 108. Radial flow channel 124 is hydraulically connected to the apply chamber. Piston 154 includes plate 160, friction material ring 162, and flow orifice 164. The friction material ring is fixed to the plate and includes friction material groove 166. The flow orifice extends through the plate and the friction material ring to the friction material groove. Similarly, piston 156 includes a plate, ring, and orifice, similar to piston 154. Although both pistons are shown with orifices, some embodiments may include only one piston with an orifice.

Hybrid module 100 includes backing plates 168 and 170. Backing plate 168 is rotationally fixed to the rotor at laser weld 172, for example, and arranged for sealing to the input shaft of the planetary transmission by seals 174 and 176, for example. Backing plate 170 is rotationally fixed to the rotor at laser weld 178, for example, and arranged for radially positioning the rotor relative to the housing as described in more detail below. Clutch 108 is disposed axially between the backing plate 168 and backing plate 170. Backing plate 168 includes radially inner portion 180 with axially opposed circumferential grooves 182 and 184. Seals 174 and 176 are disposed in grooves 182 and 184, respectively. Hybrid module 100 includes diverter plate 186, fixed to backing plate 170, for providing a balancing oil to piston 154.

Sealing hub 132 is fixed to flow plate assembly 112 by laser weld 188, for example. Bearing 190 is arranged radially between the sealing hub and backing plate 170 for radially positioning the rotor relative to the housing. Piston 154 is fixed to drive hub 134 by laser weld 192, for example.

Flywheel assembly 200 for hybrid module 100 includes flywheel 202, arcuately-shaped coil spring, or arc spring, 204, and cover plate 206. Flywheel 202 is arranged for fixing to an engine at bolts 208, for example, and includes toroidal groove 210. The arcuately-shaped coil spring is disposed in the toroidal groove. The cover plate is fixed to the flywheel and arranged to axially retain the arcuately-shaped coil spring in the toroidal groove. Flywheel assembly 200 includes shell 212 disposed radially between the toroidal groove and the arcuately-shaped coil spring.

Flywheel assembly 200 includes flange 214 drivingly engaged with the arcuately-shaped coil spring. The cover plate includes cylindrical protrusion 216 and the flange includes cylindrical protrusion 218, radially inside of and at least partially axially aligned with cylindrical protrusion 216. Cylindrical protrusion 218 includes spline 220. Flywheel assembly 200 includes ring gear 222, fixed to the flywheel and arranged for driving connection with a starter motor to start the engine.

Figure 2:
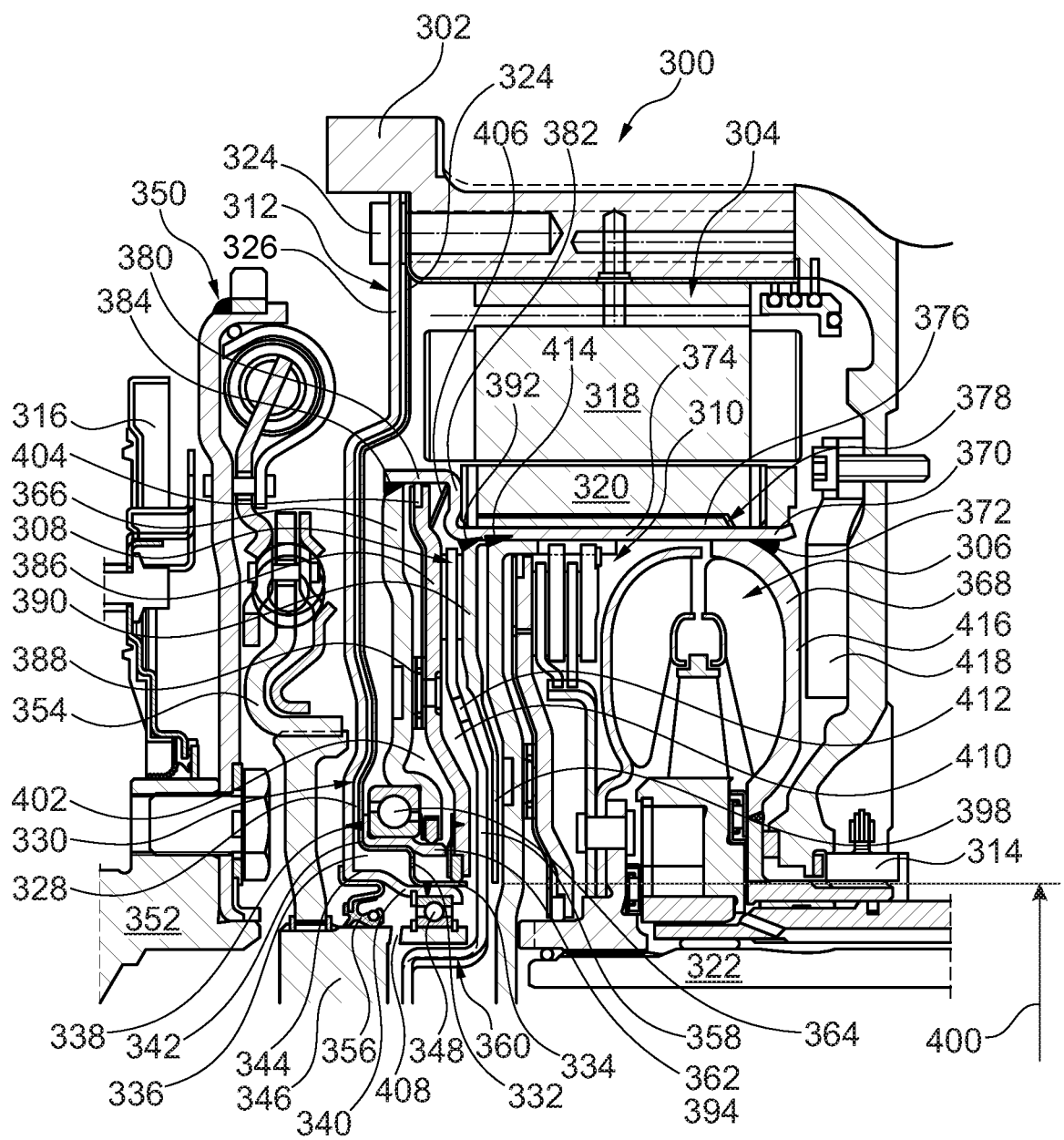
FIG. 2 illustrates a top-half cross-sectional view of an alternative embodiment of a hybrid module according to an example aspect of the disclosure.

The following description if made with reference to FIG. 2. FIG. 2 illustrates a top-half cross-sectional view of hybrid module 300 according to an example aspect of the disclosure. Hybrid module 300 includes housing 302, electric motor 304, hydraulic coupling 306, clutches 308 and 310, and flow plate assembly 312. The housing is arranged for fixing to planetary transmission (partially shown at 314) and engine (partially shown at 316). The electric motor is disposed in the housing and includes stator 318, fixed to the housing, and rotor 320, rotatable relative to the housing. The hydraulic coupling is disposed in the housing and is at least partially radially inside of the electric motor. Clutch 308 is for drivingly connecting the rotor to the engine. Clutch 310 is arranged in parallel with the hydraulic coupling for drivingly connecting the rotor to input shaft 322 of the planetary transmission. The flow plate assembly is fixed to the housing at bolts 323, for example, and includes flow plates 324 and 326. Flow plate 324 includes radial groove 328 forming a first portion of radial flow channel 328. Flow plate 326 is fixed to flow plate 324 and forms a second portion of radial flow channel 330.

Flow plate 324 includes radially inner orifice 332. Flow plate 324 and flow plate 326 are fixed together radially inside of radially inner orifice 332 at weld 334, for example. The flow plate assembly includes chamber 336 in fluid communication with radial flow channel 330 and radially inner orifice 332. Flow plate 324 and flow plate 326 are fixed together radially outside of radially inner orifice 332 by weld 338, for example. Flow plate 326 includes radially inner orifice (shown dashed at 340). Flow plates 324 and 326 are fixed together radially inside of radially inner orifice 340 (by weld 334, for example) and radially outside of radially inner orifice 340 (by weld 338, for example). Flow plate 324 includes a radial groove (not shown), circumferentially offset from radial groove 328, forming a first portion of a second radial flow channel (now shown) and flow plate 326 includes a second portion of the second radial flow channel. To be clear, the second radial flow channel appears similar in cross section to radial flow channel 330 shown in FIG. 2 but the second radial flow channel is rotated and cannot be seen in the section shown in FIG. 2. It should also be noted that weld 338 is discontinuous at the radial flow channels, allowing a fluid flow therethrough.

Hybrid module 300 includes chamber 336 in fluid communication with radial flow channel 330, and a second chamber (not shown) in fluid communication with the second radial flow channel and radially inner orifice 340. Chamber 336 is circumferentially offset with respect to the second chamber, similar to the flow channels described above. Flow plate 324 includes undulating portion 342 forming a portion of chamber 336 and the second chamber.

That is, flow plate 324 includes portion 342 as shown in FIG. 2 forming a portion chamber 336, and a similar, circumferentially offset portion (not shown) that forms a portion of the second chamber. Plates 324 and 326 are tightly fitted between the portions so that the tight fit coupled with welds 334 and 338 separate the chambers. In some embodiments, plates 324 and 326 may be sealed together at surface 344 between the chambers. Radial flow channel 330 is for providing a pressurized fluid to engage clutch 308 as will be described in more detail below. The second radial groove is for providing a cooling flow to the clutch 308, rotor 320, and stator 318 as will be described in more detail below.

Hybrid module 300 includes drive hub 346 and bearing 348. The drive hub is arranged for driving connection to the engine. That is, damper 350 is fixed to engine crankshaft 352 and the drive hub is drivingly engaged with damper output flange 354. Although the hub shown connected to the engine through the damper, other embodiments are possible. For example, other embodiments may include hub 346 directly connected to the engine crankshaft or connected through a flexplate. The bearing is arranged radially between the drive hub and the flow plate assembly for radially positioning the drive hub in the housing. The hybrid module includes lip seal 356 with a garter spring for sealing the flow plate assembly to the drive hub. Clutch 308 includes clutch plate 358 drivingly engaged with the drive hub at spline 360, for example. Hybrid module 300 includes bearing ring 362, bearing 364, and end plate 366. The bearing ring is arranged on an outer diameter of undulating portion 342 bearing 364 is arranged radially between the bearing ring and the end plate for radially positioning the rotor in the housing.

Hydraulic coupling 306 includes impeller shell 368. Hybrid module 300 includes rotor carrier 370. The rotor carrier is arranged radially between the hydraulic coupling and the rotor, and is fixed to the impeller shell at weld 372, for example. The rotor carrier includes cylindrical portion 374 with radially protruding key 376. The rotor has radial slot 378. The radially protruding key is disposed in the radial slot to rotationally fix the rotor carrier to the rotor. The rotor carrier includes cylindrical portion 380, radially outside of cylindrical portion 374, and radial wall 382 connecting cylindrical portions 374 and 380. End plate 366 is fixed to cylindrical portion 380 by weld 384, for example.

Clutch 308 includes piston 386 drivingly engaged with the end plate and axially displaceable relative to the end plate to engage the clutch 308. Piston 386 may be connected to end plate 366 by leaf spring 388, for example. Hybrid module 300 includes backing plate 390 fixed to the rotor carrier at weld 392, for example. Piston 386 is sealed to flow plate assembly 312 by seal 394, for example, at sealing diameter 396. Piston 386 is arranged to clamp clutch plate 358 against backing plate 390 to engage clutch 308. Backing plate 390 includes radially inwardly extending portion 398 with inner diameter 400 radially aligned with the sealing diameter.

Pressurized fluid from radial flow channel 330 passes through orifice 332 to chamber 402 between piston 386 and end plate 366, urging piston 386 towards clutch plate 358, clamping the clutch plate against backing plate 390 to engage clutch 308 connecting the engine to the electric motor rotor. The piston is sealed to the rotor carrier at seal 404 and flow plate 324 at seal 394. The end plate is sealed to bearing ring 362 at seal 396. Ring 362 is sealed to flow plate 324 by weld 338. Release spring 406 is arranged between the piston and the rotor carrier to release clutch 308 when pressure is removed from chamber 402.

Cooling flow from the second radial flow channel flows through orifice 340, through drilled hole 408 in drive hub 346 and/or bearing 348 to chamber 410 between piston 386 and backing plate 390. Orifice 412 in clutch plate 358 balances pressure on either axial side of the clutch plate. Backing plate inner diameter 400 is aligned with piston sealing diameter 396 to provide a balancing oil for the piston. That is, chamber 410 acts as a balance chamber to keep oil on both sides of piston 386, helping to negate effects of dynamic pressure during operation of clutch 308 in a rotating environment. Excess oil leaks past inwardly extending portion 398 and through orifice 414 in rotor carrier 370 to cool rotor 320 and stator 318.

Impeller shell 368 includes flattened portion 416. Rotor position sensor (RPS) 418 is fixed to transmission 314. Other embodiments (not shown) may include RPS fixed to housing 302. The RPS is an axial sensor. Flattened portion 416 includes a pattern (not shown) readable by sensor 418. The pattern may be a machined target base in the form of a sine structure, possibly in the form of a double edged target as described by Sumida Corporation for their RPS axial sensors. The pattern may be a single edged target or a double single edged target. In addition to milling, the target may be a PCB with an etched sine trace or a sprayed copper on a steel ground material. The trace may be machined as a positive or negative trace—that is, the trace can be milled or the material around the trace can be milled so that the trace stands above the milled surface. Some embodiments may even include a stamped trace.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMERALS

100 Hybrid module
102 Housing
104 Electric motor
106 Hydraulic coupling
108 Clutch (first)
110 Clutch (second)
112 Flow plate assembly
114 Stator
116 Rotor
118 Input shaft
120 Flow plate (first)
122 Radial groove
124 Radial flow channel
126 Flow plate (second)
128 Radially inner orifice
130 Laser weld
132 Sealing hub
134 Drive hub
136 Flow channel (sealing hub)
138 Flow channel (drive hub)
140 Circumferential groove
142 Axial side (first)
144 Axial side (second)
146 Dynamic seal (first side)
148 Dynamic seal (second side)
150 Shaft seal
152 Garter spring
154 Piston (first)
156 Piston (second)
158 Apply chamber
160 Plate (piston)
162 Friction material ring
164 Orifice
166 Friction material groove
168 Backing plate (first)
170 Backing plate (second)
172 Laser weld
174 Seal
176 Seal
178 Laser weld
180 Radially inner portion
182 Circumferential groove
184 Circumferential groove
186 Diverter plate
188 Laser weld
190 Bearing
192 Laser weld
200 Flywheel assembly
202 Flywheel
204 Arcuately-shaped coil spring
206 Cover plate
208 Engine bolts
210 Toroidal groove
212 Shell
214 Flange
216 Cylindrical protrusion (first)
218 Cylindrical protrusion (second)
220 Spline
222 Ring gear
300 Hybrid module
302 Housing
304 Electric motor
306 Hydraulic coupling
308 Clutch (first)
310 Clutch (second)
312 Flow plate assembly
314 Planetary transmission (partial)
316 Engine (partial)
318 Stator
320 Rotor
322 Input shaft
323 Bolts
324 Flow plate (first)
326 Flow plate (second)
328 Radial groove (first)
330 Radial flow channel (first)
332 Radially inner orifice (first)

334 Weld (inner)
336 Chamber (first)
338 Weld (outer)
340 Radially inner orifice (second, shown dashed)
342 Undulating portion
344 Sealing surface
346 Drive hub
348 Bearing (first, inner)
350 Damper
352 Engine crankshaft
354 Damper output flange
356 Lip seal
358 Clutch plate
360 Spline
362 Bearing ring
364 Bearing (second, outer)
366 End plate
368 Impeller shell
370 Rotor carrier
372 Weld (rotor carrier/impeller shell)
374 Cylindrical portion (first)
376 Protruding key
378 Radial slot
380 Cylindrical portion (second)
382 Radial wall
384 Weld (end plate/cylindrical portion)
386 Piston
388 Leaf spring
390 Backing plate
392 Weld (backing plate/rotor carrier)
394 Seal (piston/flow plate assembly)
396 Sealing diameter
398 Radially inwardly extending portion
400 Inner diameter
402 Chamber (piston/end plate)
404 Seal (piston/rotor carrier)
406 Release spring
408 Drilled hole (drive hub)
410 Chamber (piston/backing plate)
412 Orifice (clutch plate)
414 Orifice (rotor carrier)

What is claimed is:

1. A hybrid module, comprising:
a housing arranged for fixing to a planetary transmission and an engine;
an electric motor disposed in the housing, the electric motor comprising a stator fixed to the housing and a rotor rotatable relative to the housing;
a hydraulic coupling disposed in the housing and comprising a hydrodynamic torus at least partially radially and axially inside of the electric motor;
a first clutch for drivingly connecting the rotor to the engine;
a second clutch arranged in parallel with the hydraulic coupling for drivingly connecting the rotor to an input shaft of the planetary transmission; and,
a flow plate assembly fixed to the housing, the flow plate assembly comprising:
a first flow plate comprising a first radial groove forming a first portion of a first radial flow channel; and,
a second flow plate, fixed to the first flow plate, forming a second portion of the first radial flow channel.

2. The hybrid module of claim 1 wherein:
the first flow plate comprises a first radially inner orifice; and,
the first flow plate and the second flow plate are fixed together radially inside of the first radially inner orifice.

3. The hybrid module of claim 2 wherein the flow plate assembly comprises a first chamber in fluid communication with the first radial flow channel and the first radially inner orifice.

4. The hybrid module of claim 2 wherein the first flow plate and the second flow plate are fixed together radially outside of the first radially inner orifice.

5. The hybrid module of claim 1 wherein:
the second flow plate comprises a second radially inner orifice;
the first flow plate and the second flow plate are fixed together radially inside of the second radially inner orifice; and,
the first flow plate and the second flow plate are fixed together radially outside of the second radially inner orifice.

6. The hybrid module of claim 5 wherein:
the first flow plate comprises a second radial groove, circumferentially offset from the first radial groove, forming a first portion of a second radial flow channel; and,
the second flow plate comprises a second portion of the second radial flow channel.

7. The hybrid module of claim 6 wherein:
the flow plate assembly comprises:
a first chamber in fluid communication with the first radial flow channel; and,
a second chamber in fluid communication with the second radial flow channel and the second radially inner orifice; and,
the first chamber is circumferentially offset with respect to the second chamber.

8. The hybrid module of claim 7 wherein the first flow plate comprises an undulating portion forming at least a portion of the first chamber and the second chamber.

9. The hybrid module of claim 6 wherein:
the first radial flow channel is for providing a pressurized fluid to engage the first clutch; and,
the second radial flow channel is for providing a cooling flow to the first clutch.

10. The hybrid module of claim 9 wherein the second radial flow channel also provides a cooling flow to the rotor and the stator.

11. A hybrid module, comprising:
a housing arranged for fixing to a planetary transmission and an engine;
an electric motor disposed in the housing, the electric motor comprising a stator fixed to the housing and a rotor rotatable relative to the housing;
a hydraulic coupling disposed in the housing and comprising a hydrodynamic torus at least partially radially and axially inside of the electric motor;
a first clutch for drivingly connecting the rotor to the engine;
a second clutch arranged in parallel with the hydraulic coupling for drivingly connecting the rotor to an input shaft of the planetary transmission;
a flow plate assembly fixed to the housing;
a drive hub arranged for driving connection to the engine; and,
a first bearing arranged radially between the drive hub and the flow plate assembly for radially positioning the drive hub in the housing.

12. The hybrid module of claim 11 further comprising a lip seal with a garter spring for sealing the flow plate assembly to the drive hub.

13. The hybrid module of claim 11 wherein the first clutch comprises a clutch plate drivingly engaged with the drive hub.

14. The hybrid module of claim 11 further comprising:
a bearing ring;
a second bearing; and,
an end plate, wherein:
   the flow plate assembly comprises a first flow plate;
   the first flow plate comprises an undulating portion;
   the bearing ring is arranged on an outer diameter of the undulating portion; and,
   the second bearing is arranged radially between the bearing ring and the end plate for radially positioning the rotor in the housing.

15. A hybrid module, comprising:
a housing arranged for fixing to a planetary transmission and an engine;
an electric motor disposed in the housing, the electric motor comprising a stator fixed to the housing and a rotor rotatable relative to the housing;
a hydraulic coupling disposed in the housing and at least partially radially inside of the electric motor, the hydraulic coupling comprising an impeller shell;
a first clutch for drivingly connecting the rotor to the engine;
a second clutch arranged in parallel with the hydraulic coupling for drivingly connecting the rotor to an input shaft of the planetary transmission; and,
a rotor carrier:
   arranged radially between the hydraulic coupling and the rotor;
   fixed to the impeller shell;
   rotationally fixed to the rotor; and comprising:
      a first cylindrical portion;
      a second cylindrical portion, radially outside of the first cylindrical portion; and,
      a radial wall connecting the first cylindrical portion to the second cylindrical portion.

16. The hybrid module of claim 15 wherein:
the first cylindrical portion comprises a radially protruding key;
the rotor comprises a radial slot; and,
the radially protruding key is disposed in the radial slot to rotationally fix the rotor carrier to the rotor.

17. The hybrid module of claim 15 further comprising:
a flow plate assembly fixed to the housing;
an end plate fixed to the second cylindrical portion; and,
a bearing disposed radially between the flow plate assembly and the end plate to radially position the rotor in the housing.

18. The hybrid module of claim 17 wherein the first clutch comprises a piston drivingly engaged with the end plate and axially displaceable relative to the end plate to engage the first clutch.

19. The hybrid module of claim 18 further comprising a backing plate fixed to the rotor carrier, wherein:
the first clutch comprises a clutch plate;
the piston is sealed to the flow plate assembly at a sealing diameter;
the piston is arranged to clamp the clutch plate against the backing plate; and,
the backing plate comprises a radially inwardly extending portion with an inner diameter radially aligned with the sealing diameter.

* * * * *